(12) United States Patent
Laugwitz et al.

(10) Patent No.: US 8,775,952 B2
(45) Date of Patent: *Jul. 8, 2014

(54) INTELLIGENT ROADMAP NAVIGATION IN A GRAPHICAL USER INTERFACE

(75) Inventors: Bettina Laugwitz, Ludwigshafen (DE); Christopher Ronnewinkel, Heidelberg (DE); Susann Stieler, Leimen (DE); Farid Toubal-Seghir, Montreal (CA)

(73) Assignee: SAP AG, Walldorf (DE)

( * ) Notice: Subject to any disclaimer, the term of this patent is extended or adjusted under 35 U.S.C. 154(b) by 798 days.

This patent is subject to a terminal disclaimer.

(21) Appl. No.: 12/634,853

(22) Filed: Dec. 10, 2009

(65) Prior Publication Data

US 2011/0145737 A1 Jun. 16, 2011

(51) Int. Cl.
G06F 3/048 (2013.01)
G06F 3/0485 (2013.01)
G06F 3/0482 (2013.01)

(52) U.S. Cl.
CPC ............ *G06F 3/0485* (2013.01); *G06F 3/0482* (2013.01)
USPC ........... 715/763; 715/719; 715/734; 715/767; 715/811

(58) Field of Classification Search
CPC .............................. G06F 3/0482; G06F 3/0485
USPC .................. 715/763, 712, 719, 734, 811, 853
See application file for complete search history.

(56) References Cited

U.S. PATENT DOCUMENTS

| | | | |
|---|---|---|---|
| 7,152,210 B1 * | 12/2006 | Van Den Hoven et al. | ... 715/723 |
| 7,581,186 B2 | 8/2009 | Dowdy et al. | |
| 2003/0026594 A1 * | 2/2003 | Shiiyama | 386/69 |
| 2005/0162395 A1 * | 7/2005 | Unruh | 345/169 |
| 2006/0250358 A1 * | 11/2006 | Wroblewski | 345/157 |
| 2008/0082927 A1 * | 4/2008 | Kelts | 715/762 |
| 2008/0270931 A1 * | 10/2008 | Bamford | 715/777 |
| 2008/0309475 A1 * | 12/2008 | Kuno et al. | 340/462 |
| 2009/0002335 A1 * | 1/2009 | Chaudhri | 345/173 |
| 2009/0119614 A1 * | 5/2009 | Tienvieri et al. | 715/786 |
| 2009/0125843 A1 * | 5/2009 | Billmaier et al. | 715/835 |
| 2009/0164944 A1 * | 6/2009 | Webster et al. | 715/838 |
| 2010/0043028 A1 * | 2/2010 | Cormican et al. | 725/52 |
| 2010/0123737 A1 * | 5/2010 | Williamson et al. | 345/672 |

OTHER PUBLICATIONS

Xie et al., Browsing Large Pictures Under Limited Display Sizes; © 2006; IEEE; vol. 8, No. 4; 9 pages.*
Free Software Foundation, Inc., Controlling the Display—Automatic Scrolling; GNU Emacs Manual pp. 64-65; Free Software Foundation, Inc., MA, USA; 2009 (http://www.gnu.org/software/emacs/manual/emacs.pdf).

* cited by examiner

*Primary Examiner* — Linh K Pham (57) ABSTRACT

Systems and methods for intelligent information navigation in a graphical user interface (GUI) where a sequence of items is generated and stored in a memory of a computer system. A number of graphical elements are displayed on a screen of a GUI, wherein each graphical element corresponds to an item of the sequence of items, and wherein the graphical elements are ordered according to the sequence. When requested, the graphical elements scroll in a chosen direction to gradually include a new graphical element into the screen at the direction of scrolling. Respectively, the scrolling could gradually exclude from the screen a graphical element at opposite direction. An item of the sequence of items could be selected as a currently active item. The displayed graphical elements are automatically scrolled to move the graphical element corresponding to the currently active item at a focal position within the screen.

18 Claims, 9 Drawing Sheets

INTELLIGENT ROADMAP NAVIGATION IN A GRAPHICAL USER INTERFACE

TECHNICAL FIELD

The field of the invention relates generally to data processing and digital processing systems. More specifically, the invention is related to presentation of information and navigation in a graphical user interface.

BACKGROUND

Generally, modern computer applications, including business applications (e.g., enterprise resource planning (ERP) system applications, customer relationship management (CRM) applications, etc.), implement graphical user interfaces to interact with users. The growing complexity of the functionality embedded in such applications, and the abundance of managed data present a significant challenge for the application developers to design efficient and detailed user interfaces within the limited space of display devices. Usually, users have to scroll and swap/switch between a multitude of screens in their interaction with the applications to perform various tasks and to achieve desired results. In such a complex interface environment, it is necessary to maintain user's focus by tracking the accomplished work and keeping an up-to-date plan for the next actions.

Many business applications implement wizards or other types of techniques to guide users during execution of sequences of tasks of a complex process. The tasks are successively displayed one after another for execution in a graphical user interface (GUI), where the execution of one task invokes an interface for execution of a next task. Often, a roadmap is displayed within the GUI to help users keep track of a task flow while accomplishing a complex process. Such roadmaps could be described as plans that contain tasks and dependencies for accomplishment of complex processes. Roadmaps help users to navigate between tasks, inform the users for the executed tasks and the forthcoming tasks, provide additional information associated with the tasks, etc. Occasionally, roadmaps cannot display all the tasks of a process within a single screen. Therefore, a user has to navigate along a roadmap in a GUI to review the different tasks of a process.

The implementation of roadmaps provides significant advantage to users during the execution of guided procedures. Similarly, there are various other GUI tools that provide additional information to a user in order to facilitate the accomplishment of a particular action. When the additional information for accomplishment of a particular task is not provided in a single screen, a user has to scroll or navigate between numerous screens during the execution of the task. This navigation or scrolling could cause inefficiency and uncertainty in user's actions. Thus, the overall user performance, as well as the objective and subjective perception for usability of an application GUI, could be harmed.

SUMMARY

Systems and methods for intelligent information navigation in a graphical user interface (GUI) are described. A sequence of items is generated and stored in a memory of a computer system. A number of graphical elements are displayed on a screen of a GUI, wherein each graphical element corresponds to an item of the sequence of items, and wherein the graphical elements are ordered according to the sequence. When requested, the graphical elements scroll in a chosen direction to gradually include a new graphical element into the screen from the direction of scrolling. Respectively, the scrolling could gradually exclude from the screen a graphical element in opposite direction. An item of the sequence of items could be selected as a currently active item. The displayed graphical elements are automatically scrolled to move the graphical element corresponding to the currently active item at a focal position within the screen.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for intelligent roadmap navigation in a graphical user interface (GUI) are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
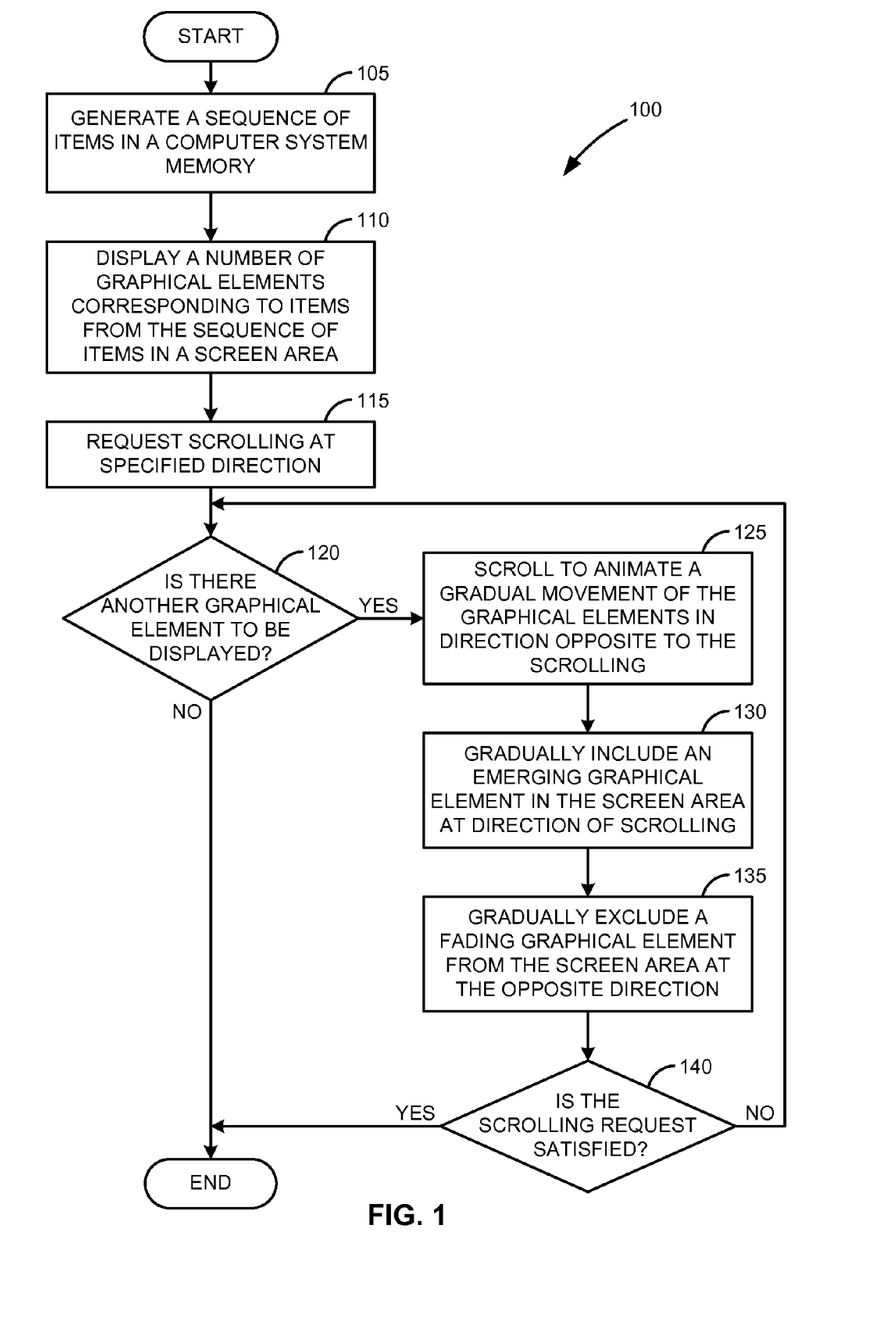
FIG. 1 illustrates a process for intelligent information navigation within a graphical user interface (GUI), according to one embodiment of the invention.

FIG. 1 illustrates process 100 for intelligent information navigation in a GUI. Process 100 starts at 105 with generating a sequence of items in a computer system. An "item" may be used to refer to an information object in a broad sense. For example, item could be a programming object, a textual word or a sign, an electronic table cell, a picture, etc. The generation of sequence of items is a preliminary action that could be performed long before the execution of the rest of the actions of process 100. The sequence of items could be generated dynamically at a user request, could be generated during development of an application, could be received from another computer system, etc.

In one embodiment of the invention, tasks of a particular business process are assigned to one or more of the items from the sequence. Thus, the sequence of items could be described as a roadmap for achieving a particular business goal by encompassing a series of tasks or steps. The execution of each task assigned to an item of the roadmap will typically change the state of the completion of the process. Thus, the roadmap could mark the progress of achieving the underlying business goal. Table 1 illustrates an example of a business server page (BSP) script describing three program objects, where each program object may correspond to a roadmap item. The roadmap items can be generated based on the program object and displayed in a GUI, e.g., in a client computer Internet browser:

TABLE 1

BSP Roadmap element

```
<thtmlb:roadMap>
    <thtmlb:roadMapItem state = "ACTIVE" //This is the first step
        text = "1"
        tooltip = "Enter Data To Create Account"
        onClick = "SELECT">
    thtmlb:roadMapItem state = "INACTIVE" //This is the second step
        text = "2"
        tooltip = "Enter Data To Create Business Object"
        onClick = "SELECT">
    thtmlb:roadMapItem state = "DISABLED" //This is the third step
        text = "3"
        tooltip = "Enter Data For A New Service Ticket "
        onClick = "SELECT">
<thtmlb:roadMap>
```

In the BSP script illustrated in Table 1, "roadMap" and "roadMapItem" are BSP tags from "thtmlb" tag library developed by SAP AG. Tags "roadMap" and "roadMapItem" have attributes that could specify the roadmap and roadmap item display and behavior. For example, attribute "state" could characterize an active, e.g., current, item or step of the roadmap; an inactive step that could be selected; and a disabled step. A user cannot select or jump to a disabled item to execute a task associated with the item before a condition is satisfied, e.g., a prior action is executed. Further, "text" attribute provides a label or a title for a roadmap item or step. Attribute "tooltip" provides a text that describes an item. Tooltip text could appear in the GUI when a user moves a pointer over a graphical element that displays the item. Attribute "onClick" is used to specify an event that will be triggered when a user clicks on a graphical element with a mouse input device.

The enlisted attributes are only an example. Other attributes with different names and properties could be defined in another embodiment of the invention. Similarly, an "onSelect" attribute may specify an action that a computer system executes when an item is selected. One of ordinary skill in the art would recognize that other approaches to define roadmap items and to assign tasks to the items could be implemented. Different development technologies and libraries of other vendors could be utilized to generate a sequence of items in broad sense.

At 110, a number of graphical elements are displayed in a specified screen area of a GUI. Each of the displayed graphical elements corresponds to an item of the sequence of items. In one embodiment of the invention, the displayed graphical elements represent wholly or partially the sequence of items. The sequence of items could be regarded as a roadmap for accomplishing a particular business process by executing the tasks associated to the items from the sequence. The GUI provides information and guidance to assist a user during the accomplishment of the process by displaying the graphical elements corresponding to roadmap items and the assigned tasks. Thus, the user is easily able to monitor work progress, e.g., to review already executed tasks and to browse the upcoming steps.

Often, the number of items in the sequence is greater than the number of the displayed graphical elements within a single screen. The generated sequence usually includes a considerable number of items and if too many graphical elements are displayed in a single screen, users could get confused and disoriented. The displayed graphical elements provide details regarding the corresponding items and the assigned tasks, according to one embodiment of the invention. The details could include information for the names of the tasks, descriptions or instructions for execution, statuses of the items, the order of the items, etc. In one embodiment of the invention, an efficient GUI displays between five and ten items from the sequence of items in a single screen by using corresponding graphical elements.

In a case where the displayed graphical elements are fewer than the items in the generated sequence, the GUI could provide scrolling functionality. Thus, at 115, a scrolling is requested to change the set of the displayed items in the screen area and show one or more new graphical elements corresponding to one or more new items from the sequence. The direction where the new graphical elements appear is the direction of scrolling, and it could be specified in the scrolling request. The scrolling could be requested by a user directly in the GUI by utilizing various input devices, including a keyboard, a mouse, a touch screen, etc. For example, scrolling could be requested by using arrows keys of a keyboard; or by moving a mouse pointer over a specific GUI control or area, with or without clicking on a mouse button, or rotating a scroll wheel or scroll ball. Additionally, scrolling could be requested by a system process in response to a specific event, for example, in response to accomplishment of a task execution.

According to one embodiment of the invention, the scrolling in a requested direction is possible only if there is a next item in the sequence of items to be displayed by a graphical element from the direction of scrolling. Respectively, at 120, a check is performed whether such next item exists. If next item to be displayed at the requested direction of scrolling exists, at 125, GUI animates a gradual movement of the graphical elements in a direction opposite to the direction of scrolling. The animated gradual movement creates a visual effect for a smooth, e.g., without perceptible jumps, shift or flow of the displayed graphical elements towards the edge of the GUI screen that is opposite to the direction of scrolling. The result of the smooth animation is a user perception for continuing movement along the roadmap of items. As a consequence of this movement, at 130, a new graphical element corresponding to the next item appears from the direction of scrolling, and is gradually included in the display screen with the pace of the animated movement. The perception for "gradually" or "gradual" move of the displayed graphical elements could be created by fast continuous change of the contents of the GUI screen. The appearance of the displayed graphical objects changes by a fraction at a time commensurate with the size of a pixel, imperceptible for a human eye at the speed of change.

GUI screen allows the display of a limited number of graphical elements. Respectively, the including a new graphical element from one direction could result in excluding of an existing graphical element in opposite direction during the smooth movement along the roadmap. Accordingly, at 135, an old graphical element is gradually excluded from the roadmap screen area. The execution of this action depends on factors like the number of currently displayed graphical elements, the distribution of the graphical elements in the screen, the continuation of the animated smooth movement, etc.

The animation effect for a gradual movement along the roadmap could be further strengthened by additional visual effects. In one embodiment of the invention, at 130, the new graphical element visually emerges on the screen and gradually changes its appearance from different levels of transparency to opacity. During this emerging, the contours of the new graphical element could gradually change from dimmed to rich colors. The new graphical element emerges during smooth animated movement during or after being gradually included in the screen area.

Similar to the visual effect of emerging, the exclusion of the old element from the screen area could be strengthened with a visual effect of fading in one embodiment of the invention. In this case, at 135, the old graphical element could gradually change its visual appearance from opacity to different levels of transparency while moving gradually towards the edge of the screen area. Respectively, the contours of the graphical element could fade or dissolve from full to washy colors. The actions illustrated with blocks 120 to 135 in FIG. 1 are repeated until, at 140, it is confirmed that scrolling request is satisfied.

Figure 2:
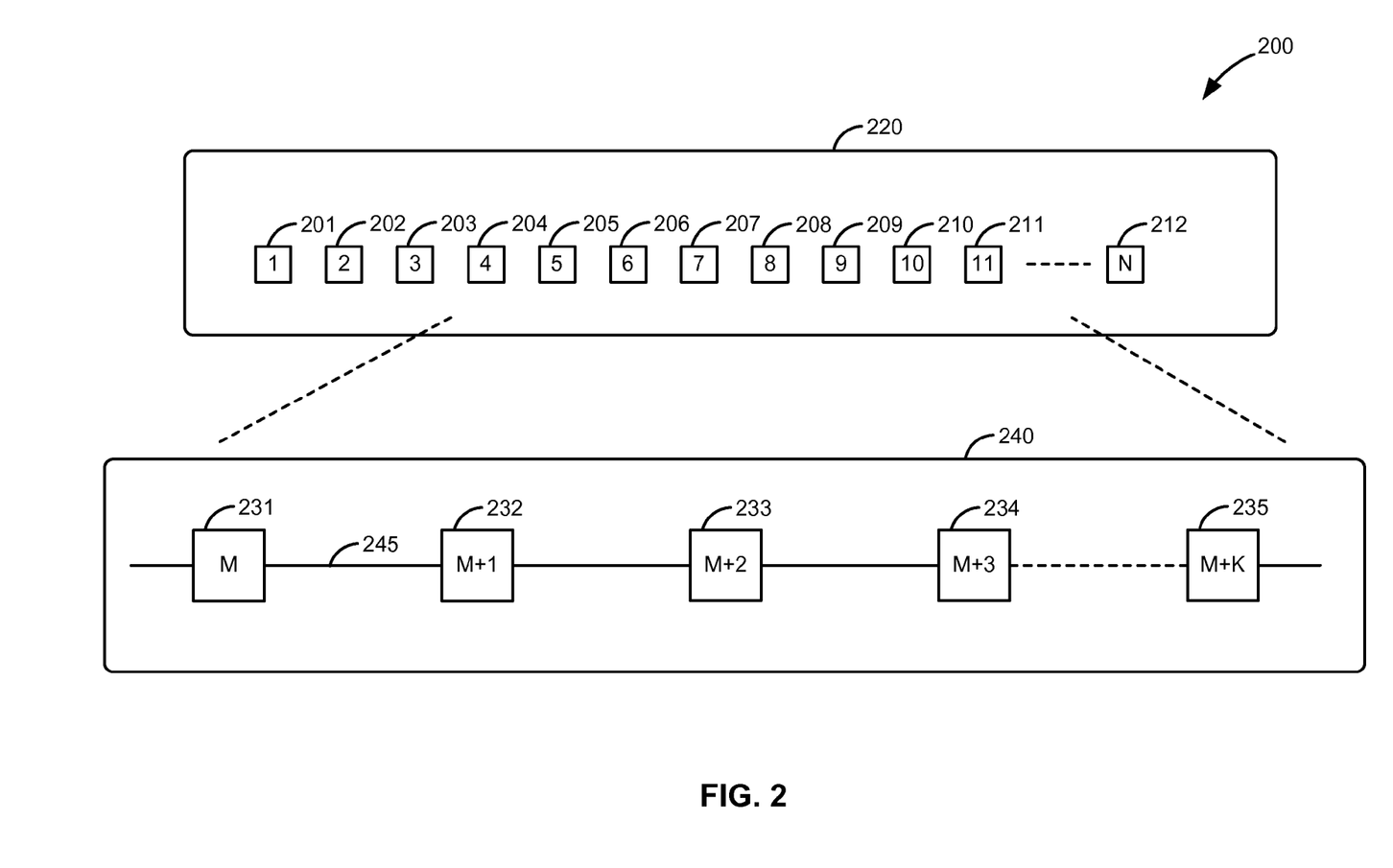
FIG. 2 is a block diagram that illustrates correspondence between a sequence of items and a number of displayed graphical objects, according to one embodiment of the invention.

FIG. 2 illustrates a correspondence between a generated sequence of items and a number of displayed graphical objects in computer system 200, according to one embodiment of the invention. Items 201 to 212 are labeled from 1 to N to illustrate that a sequence of N consecutive items is stored in memory 220 of computer system 200. The sequence of items could be programmed, or generated within computer system 200, or could be received from another computer system. The items could be any type of information objects in a broad sense.

Graphical elements 231 to 235 are displayed within screen area 240 on a display coupled to memory 220. Graphical elements are 231 to 235 are labeled from M to M+K to illustrate that K items from sequence of items 201 to 212 stored in memory 220 are displayed in screen area 240. Each of the graphical elements 231 to 235 correspond to a separate item from sequence of items 201 to 212. According to one embodiment of the invention, consecutive graphical elements 231 to 235 correspond to K consecutive items from the sequence of items 201 to 212 stored in memory 220. As illustrated, graphical elements 231 to 235 are connected by line 245 to resemble a roadmap wherein each graphical element represents a particular task or activity assigned to the corresponding item. A user could scroll along the displayed roadmap in order to review all items from the sequence of items, no more than K items at a time. The accomplishment of all tasks assigned to items 201 to 212 leads to achieving a particular application effect, e.g., business goal, according to one embodiment of the invention.

Figure 3A:
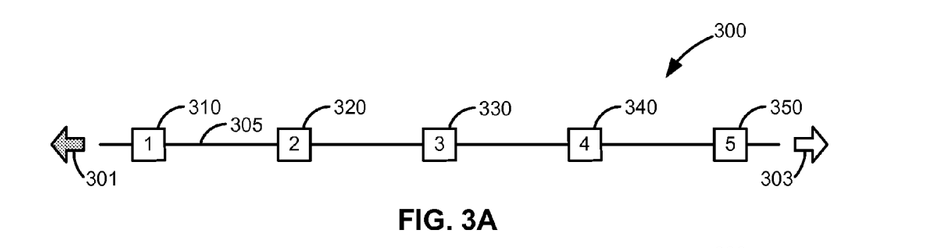
FIG. 3A is a block diagram that illustrates a GUI screen to display a number of graphical elements, according to one embodiment of the invention.

FIG. 3A to FIG. 3E are block diagrams showing a GUI screen that displays a number of graphical elements to illustrate gradual scrolling. The graphical elements correspond to items from a sequence of items, according to one embodiment of the invention. FIG. 3A illustrates an initial view of horizontal roadmap 300 displayed in a roadmap screen area of the GUI. Roadmap 300 includes graphical elements 310, 320, 330, 340 and 350, connected with line 305. Left arrow 301 and right arrow 303 are controls that could be selected by a user in order to request scrolling in a chosen direction. A user could to request scrolling of roadmap 300 with the help of an input device by pressing a button, or simply by clicking or just moving a cursor over left arrow 301 or right arrow 303. In FIG. 3A, graphical element 310 is labeled with "1" to indicate a correspondence to a first item of the sequence of items. Left arrow 301 is dimmed to indicate that even if selected, roadmap 300 will not scroll because there is no next item in the sequence of items to be displayed from the left.

Figure 3B:
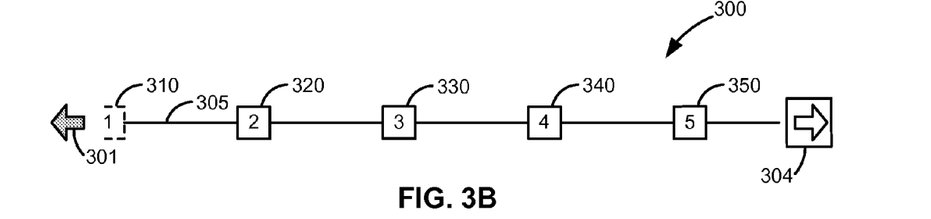
FIG. 3B is a block diagram that illustrates a GUI screen to display a number of scrolling graphical elements, according to one embodiment of the invention.

FIG. 3B illustrates horizontally displayed roadmap 300 and graphical elements 310 to 350 while scrolling or moving gradually along line 305. Right arrow 304 is drawn as surrounded in a square to indicate that it is selected by a user to request scrolling of roadmap 300 to the right of the screen area. Graphical element 310 is drawn with dashed lines to indicate that the corresponding item is currently being excluded from the set of displayed items. According to one embodiment of the invention, the dashed lines further indicate that graphical element 310 is displayed in gradually fading mode as moving towards the edge or out of the screen.

Figure 3C:
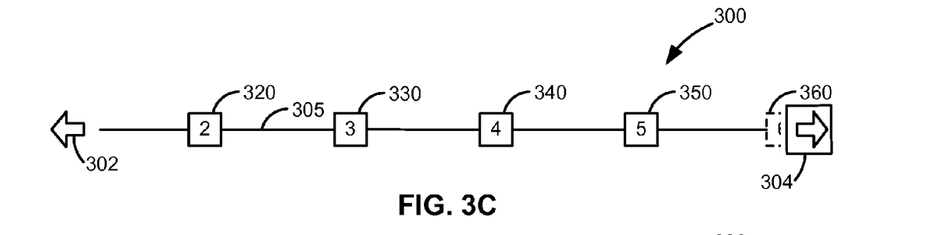
FIG. 3C is a block diagram that illustrates a GUI screen to display a number of scrolling graphical elements, according to one embodiment of the invention.

FIG. 3C illustrates horizontally displayed roadmap 300 and graphical elements 320 to 350 while moving gradually further along line 305. FIG. 3C shows graphical element 360 as a new graphical element to enter the screen area where roadmap 300 is displayed. Graphical element 360 corresponds to a next item of the sequence of items form the direction of scrolling that is gradually included in the set of displayed items as a result of the scrolling. The lines of graphical element 360 are dashed to indicate that graphical element appears in the screen area in an emerging mode gradually changing from transparency and dimmed colors to opacity and rich colors, according to one embodiment of the invention. Left arrow 302 is no longer dimmed, as now there is a next item in this direction that could be displayed, respectively, scrolling in left direction could be requested.

Figure 3D:
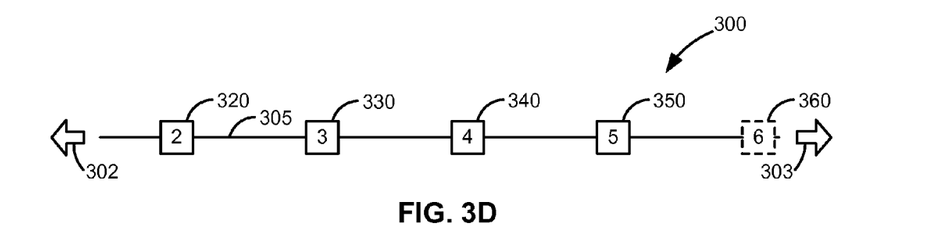
FIG. 3D is a block diagram that illustrates a GUI screen to display a number of scrolling graphical elements, according to one embodiment of the invention.
Figure 3E:
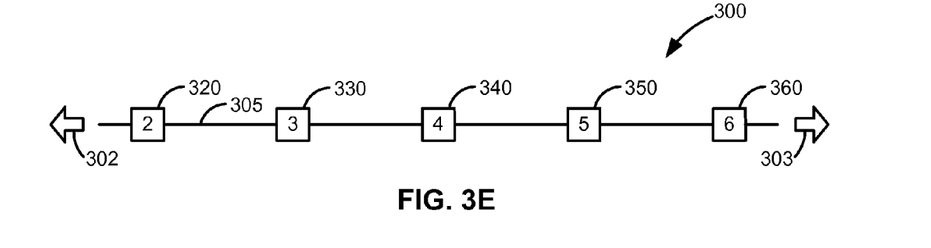
FIG. 3E is a block diagram that illustrates a GUI screen to display a number of graphical elements, according to one embodiment of the invention.

FIG. 3D illustrates horizontally displayed roadmap 300 and graphical elements 320 to 360 while moving gradually further along line 305. Right arrow 303 is no longer drawn as surrounded in a square, e.g., right arrow 303 is no longer selected. FIG. 3D indicates that the movement of graphical elements 320 to 360 along line 305, e.g., along roadmap 300, could continue even after the scrolling request is interrupted. According to one embodiment of the invention, the user could request scrolling to include just one new graphical element with a short press of a button, e.g., a single mouse click. Accordingly, the user could request longer scrolling by keeping the respective control selected for a longer time. Smooth animation movement could stop immediately when the scrolling request is interrupted, e.g., when the control is released, or the movement could continue until the displayed graphical elements are evenly distributed within the screen in full opacity and color state, as illustrated in FIG. 3E.

Referring back to process 100 shown in FIG. 1, a sequence of items is stored in a computer memory at 105. At 110, a set of the sequence of items is displayed in a GUI screen area by corresponding graphical elements. Usually, when a user executes a task assigned or related to an item of the sequence of items, it is convenient to have ready access to as much relevant information as possible for the item. According to one embodiment of the invention, intelligent and efficient information navigation in a GUI could automatically scroll displayed graphical elements to show a particular item of interest within a specified focal position of the screen area. Thus, a user will always have an overview of the currently active item and its neighboring items in the sequence of items. The user is able to follow the progress of execution of a particular process associated with the sequence of items without a necessity of additional checks and scroll requests.

Figure 4:
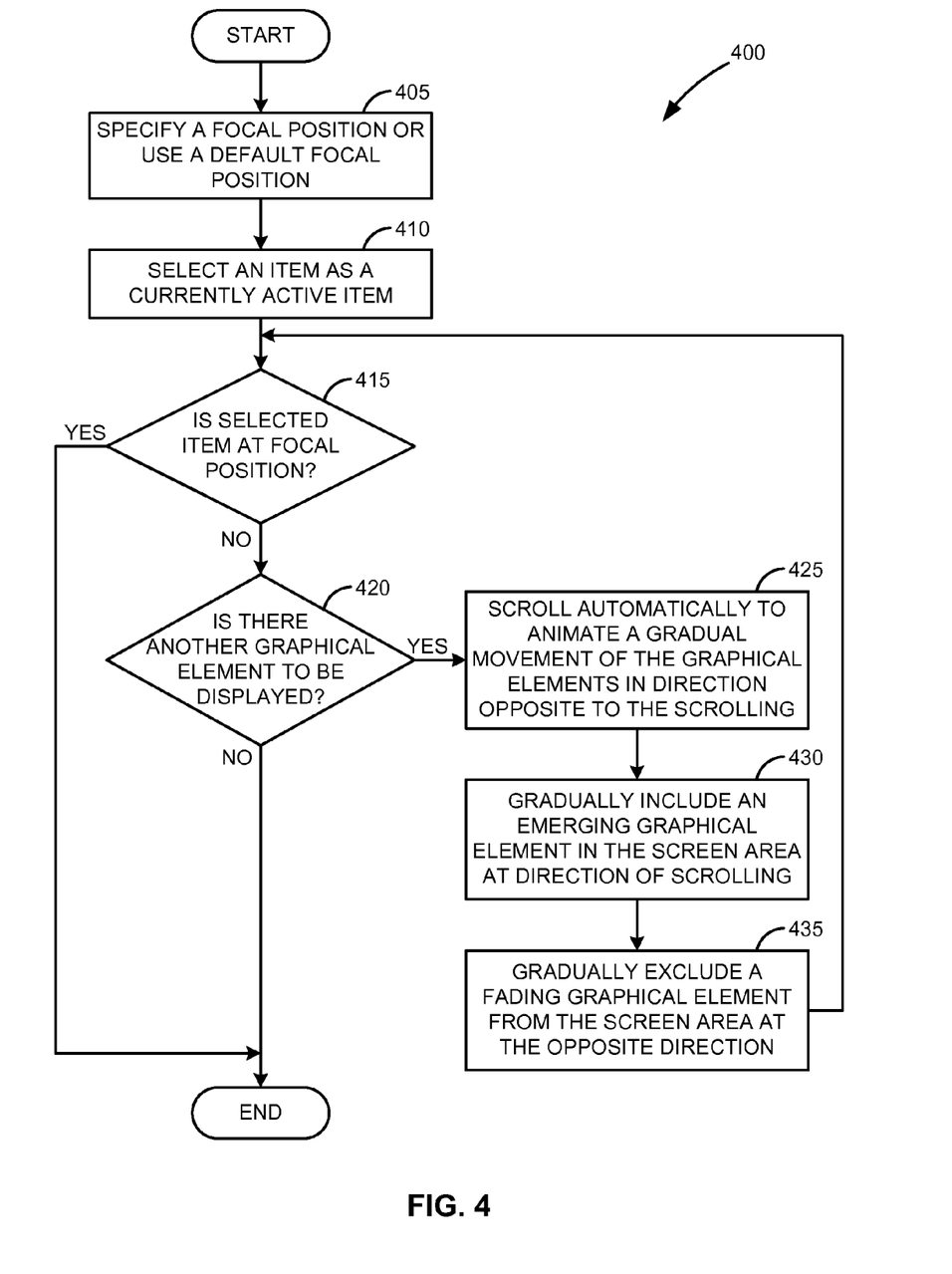
FIG. 4 illustrates a process for automatic scrolling in a GUI screen of a graphical element to a predefined focal position, according to one embodiment of the invention.

FIG. 4 illustrates process 400 for automatic scrolling of graphical elements in a GUI screen area, where the graphical elements correspond to items from a sequence of items stored in a system memory. The automatic scrolling is performed until a graphical element corresponding to a particular item of interest is moved to a predefined focal position of the GUI screen, according to one embodiment of the invention. Process 400 starts at 405 with specifying a focal position in the GUI screen area. This is a preliminary action that could be performed at an earlier stage during development or setup of an application or of the GUI. A default focal position could be automatically defined, if action 405 is omitted. Different terms could be used to specify the focal position. For example, the focal position could be defined proportioned to the GUI screen area dimensions. Alternatively, the focal position could be defined in correlation with the number and the distribution of the displayed graphical elements.

Process 400 continues at 410 with selecting an item as an item of interest or as a currently active item. There are different ways to select an item as a currently active item. For example, a user could use a keyboard, a mouse, or some other input device to directly click on a graphical element corresponding to the item, and thus selecting the item. In another example, a user may click on a button or enter data in another screen area of the GUI that could lead to an item selection. Alternatively, an item could be selected without a user action, as a result of a system event. One of ordinary skill in the art may recognize a number of other possible ways to allocate a particular item from the sequence of items stored in a system memory. If displayed, graphical element corresponding to the currently active item could be modified to indicate the selection. The modification of the graphical element could include different visual effects, e.g., change of element's borders, change of colors, change of size, etc.

At 415, a check is performed to determine whether a graphical element corresponding to the selected item is displayed at the specified focal position. If such corresponding graphical element is not displayed within the focal area, the currently displayed graphical elements are automatically scrolled to gradually move the graphical element to the focal position. In one embodiment of the invention, the scrolling starts only if, at 420, it is confirmed that a next, not currently displayed item exists in the direction of scrolling. At 425, the scrolling is started and the GUI animates a smooth movement of the displayed graphical elements in a direction opposite to the direction of scrolling. During the scrolling, at 430, an emerging new graphical element corresponding to the next item is gradually included in the display screen area from the direction of scrolling. Respectively, at 435, the first graphical element displayed in a direction opposite to the direction of scrolling could be gradually excluded from the screen area if there is not enough space. This graphical element could change its appearance in a fading mode as being excluded from the display screen area, according to one embodiment of the invention.

The smooth animation creates a visual effect for gradual movement of the displayed graphical elements. The movement continues until at 415 it is confirmed that the graphical element corresponding to the selected item is displayed at the focal position. In one embodiment of the invention, the check at 420 for a next item is not required. Thus, even if there is no next item, the displayed set of items will move until the graphical element corresponding to the selected item reaches the focal position. The action corresponding to block 430 will be performed only if there is a next item to be displayed during the scrolling.

Figure 5A:
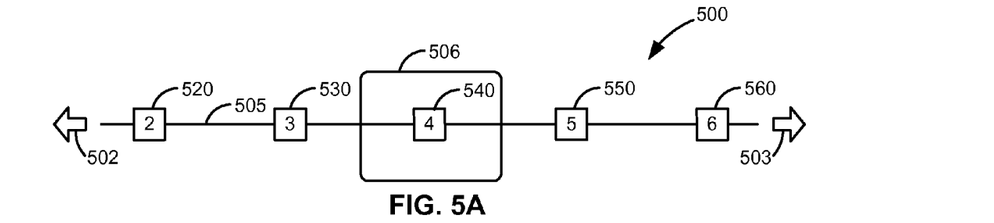
FIG. 5A is a block diagram that illustrates a GUI screen and a focal position to display a number of graphical elements, according to one embodiment of the invention.

FIG. 5A to FIG. 5E are block diagrams that show a GUI screen that display a number of graphical elements to illustrate automatic gradual scrolling, where the graphical elements correspond to items from a sequence of items stored in a system memory. The scrolling is triggered by selecting an item from the sequence of items, according to one embodiment of the invention. FIG. 5A shows an initial view of horizontal roadmap 500 displayed in a roadmap screen area of the GUI. Roadmap 500 includes graphical elements 520, 530, 540, 550 and 560, connected with line 505. Elements 520 to 560 are labeled according to the order of the corresponding items in the sequence of items. Instead of labeling each element with a consecutive number, a particular caption, a name or a description could be displayed within or next to one or more graphical elements in the roadmap screen area. Left arrow 502 and right arrow 503 are GUI controls that could be selected by a user to request scrolling of displayed graphical elements 520 to 560 towards left or right of the screen area.

Roadmap 500 includes focal area 506 defining a focal position. The boundaries of focal area 506 as illustrated in FIG. 5A are not necessarily distinctive or visible. Focal area 506 could be specified with concrete dimensions relative to the dimensions of the GUI area where roadmap 500 is displayed. Alternatively, focal area 506 could be specified in correlation with the displayed graphical elements 520 to 560. For example, focal area 506 corresponds to the middle graphical element of the evenly displayed graphical elements. Thus, for every item of the sequence of items displayed by a graphical element in the focal area 506, a certain number of previous and next items will be visualized with corresponding graphical elements, and available to a user, in the same screen.

Figure 5B:
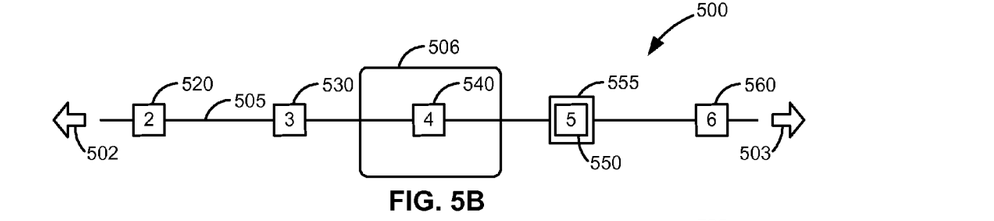
FIG. 5B is a block diagram that illustrates a GUI screen and a focal position to display a number of graphical elements, according to one embodiment of the invention.

FIG. 5B shows roadmap 500 where graphical element 550 is illustrated as surrounded with square 555 to indicate a selection. Respectively, graphical element 550 corresponds to a currently active item or to an item of interest. The selection of the item triggers an automatic scrolling of displayed graphical objects 520 to 560 along line 505 when the selected item is not displayed in focal area 506 by the corresponding graphical element.

Figure 5C:
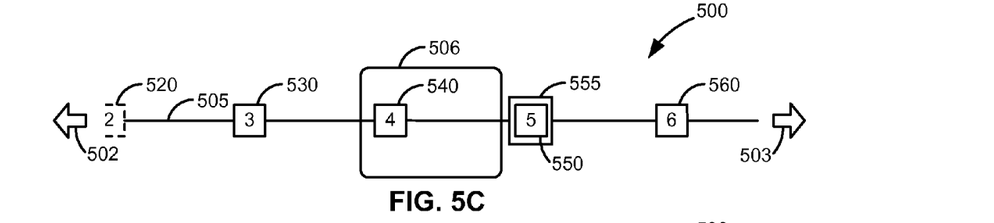
FIG. 5C is a block diagram that illustrates a GUI screen and a focal position to display a number of automatically scrolling graphical elements, according to one embodiment of the invention.

FIG. 5C illustrates automatic scrolling graphical elements 520 to 560 of roadmap 500 along line 505. The scrolling is towards graphical element 550 that corresponds to the selected item. The goal of the automatic scrolling is to place graphical element 550 within focal area 506 and thus display the item of interest and its neighboring items in the sequence of items. According to one embodiment of the invention, the scrolling creates a visual effect for a gradual movement of the visualized graphical elements in a direction that will bring graphical element 550 within focal area 506. Graphical element 520 is close to the edge of the roadmap screen. In order to preserve the even distribution of graphical elements 520 to 560 along line 505, the scrolling movement gradually excludes border graphical element 520 from the GUI screen. In FIG. 5C, graphical element 520 is drawn with dashed lines to illustrate a process of gradual exclusion in fading mode. Graphical element 520 could gradually change its colors and transparency level to strengthen the motion visual effect.

Figure 5D:
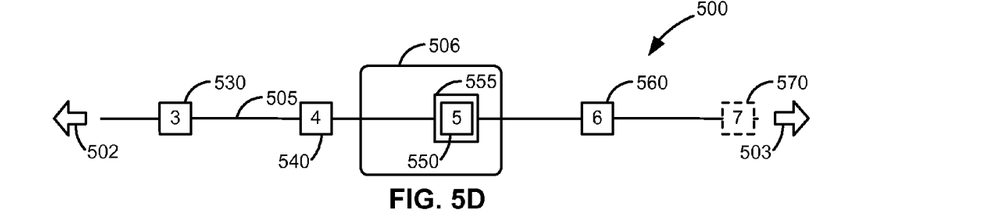
FIG. 5D is a block diagram that illustrates a GUI screen and a focal position to display a number of automatically scrolling graphical elements, according to one embodiment of the invention.
Figure 5E:
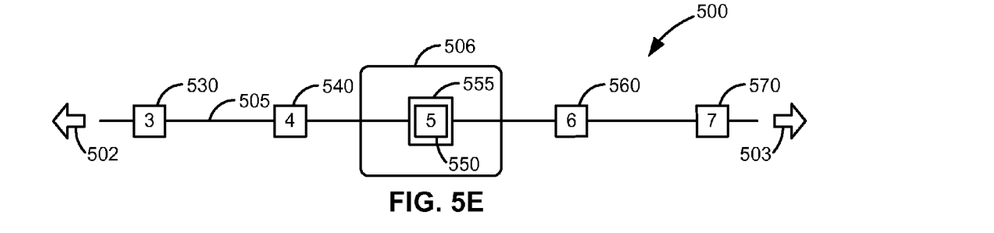
FIG. 5E is a block diagram that illustrates a GUI screen and a focal position to display a number of graphical elements, according to one embodiment of the invention.

FIG. 5D shows roadmap 500 where graphical elements 530 to 560 move further along line 505 during the automatic scrolling. The movement causes a next item of the sequence of items to be included in the set of displayed items from the direction of scrolling in order to preserve the even distribution of the displayed graphical elements. The next item is visualized by graphical element 570. In FIG. 5C, graphical element 570 is drawn with dashed lines to indicate that new graphical element 570 could be included in emerging mode, gradually changing its transparency and colors, according to one embodiment of the invention. FIG. 5D shows that graphical element 550 is already displayed in focal area 506. The scrolling, e.g., the visual motion, of displayed graphical elements 530 to 570 could stop immediately when graphical element 550 enters focal area 506. Alternatively, the motion could continue until graphical elements 530 to 570 are equally distributed within the GUI screen area, or until graphical element 550 corresponding to the selected item is centered within focal area 506, as illustrated in FIG. 5E.

Figure 6:
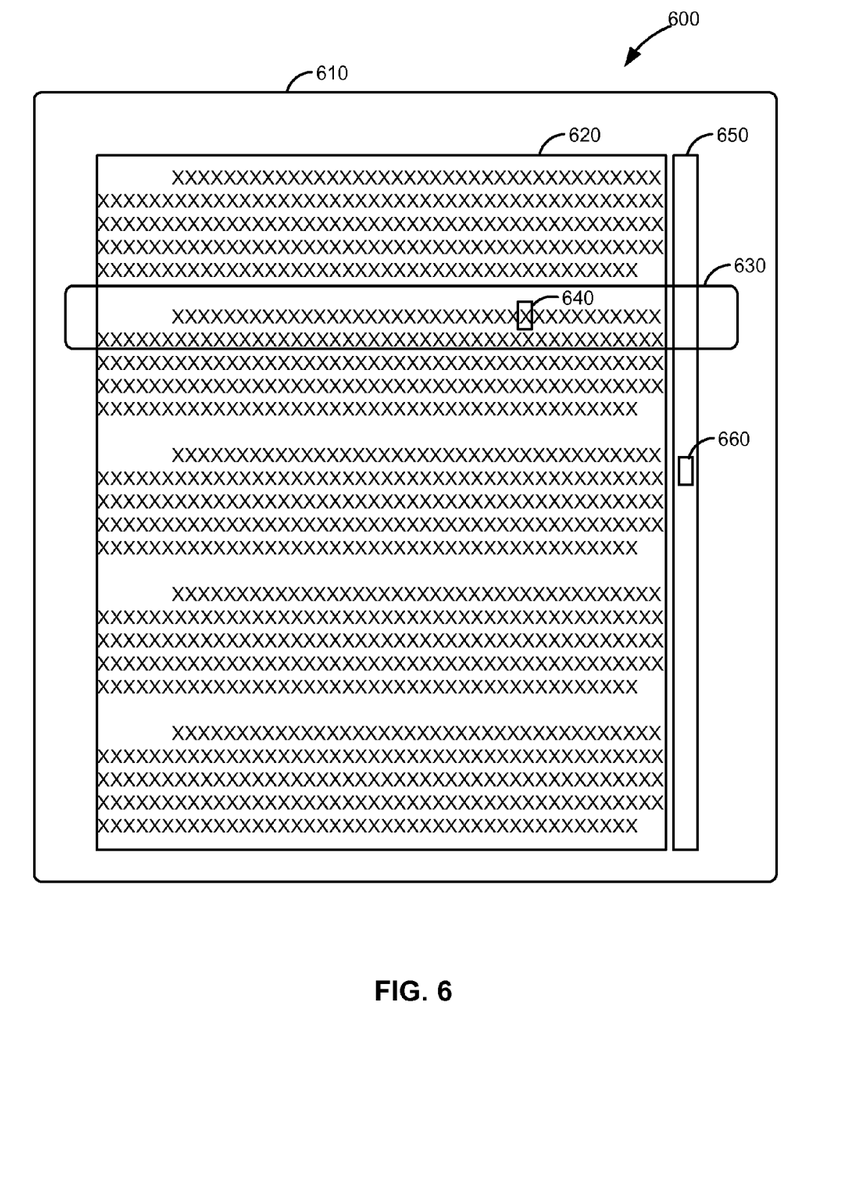
FIG. 6 is a block diagram that illustrates a GUI screen and a focal area to display a number of graphical elements, according to an embodiment of the invention.

In one embodiment of the invention, graphical elements could represent such items as words of a document, or cells of an electronic table. A word or a cell could be selected by a user through an input device by moving or placing a cursor within the word or the cell. The selection could cause the view of the whole document or electronic table to change, e.g., to automatically scroll in one or more of a vertical and horizontal direction. The scrolling continues until the selected word or cell is moved at a specified focal position or within a specified focal area. FIG. 6 is block diagram that shows GUI screen 600 including document area 610. A number of graphical elements 620 are displayed in document area 610. For example, graphical elements 620 could be text paragraphs, text rows, separate text words, or even separate text letters or various graphical signs. GUI screen 600 further includes focal area 630 that is specified and fixed on GUI screen 600 according to definitive user preferences or according to a default focal position. When a graphical element is selected, e.g., with cursor 640, and the selected graphical element is outside focal area 630, graphical elements 620 of the document scroll vertically within document area 610 to gradually move the selected graphical element, or cursor 640, towards focal area 630, until the selected graphical element is placed within focal area 630, as illustrated in FIG. 6. Scroll bar 650 is adjacent to graphical items and indicate with pointer 660 the position of cursor 640, or the position of the selected graphical element within the whole document.

Figure 7:
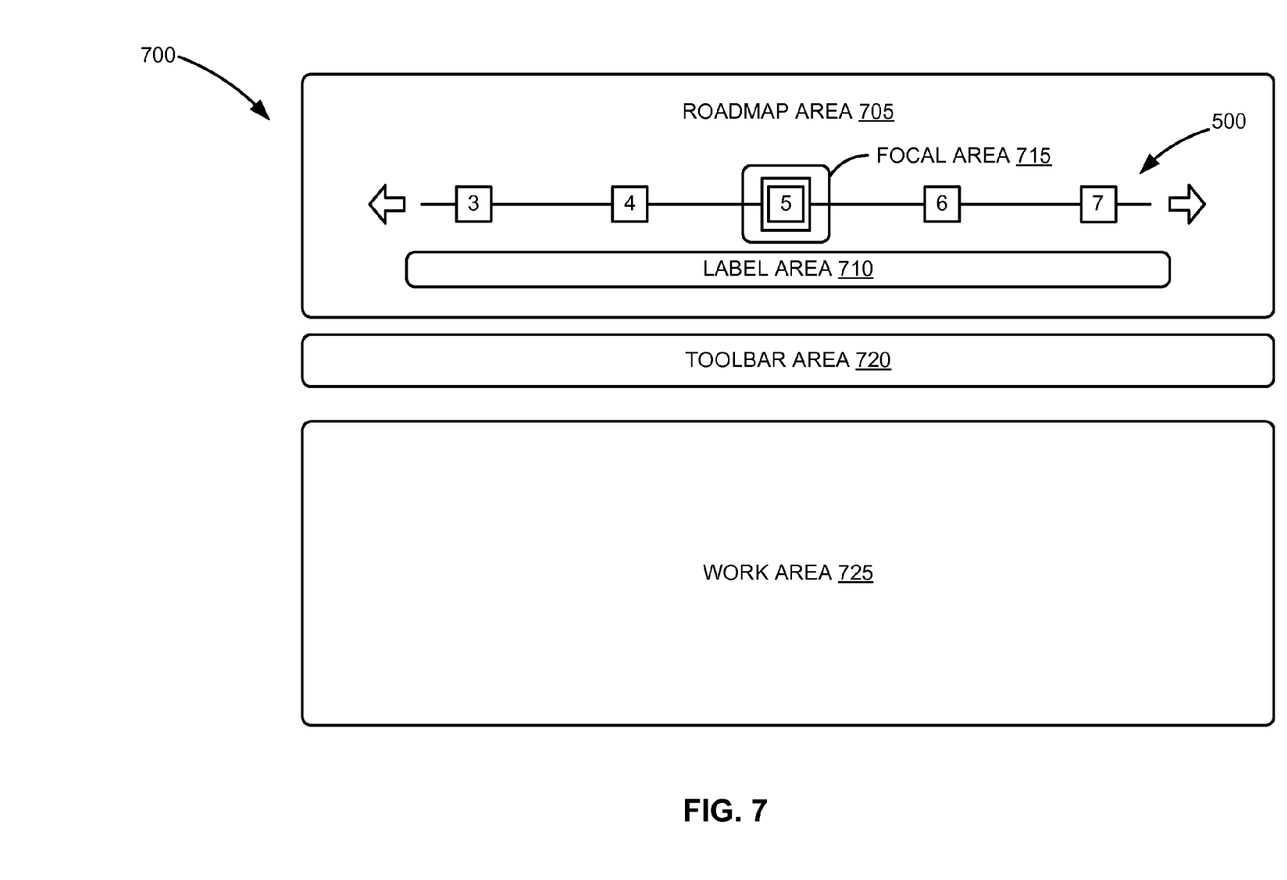
FIG. 7 is a block diagram of a GUI for intelligent information navigation, according to one embodiment of the invention.

FIG. 7 is a block diagram of GUI 700 including roadmap area 705 and work area 725. A set of consecutive items from a sequence of items are displayed as roadmap 500 in roadmap area 705. The items from the set of items are displayed by corresponding graphical elements. The sequence of items is stored in a computer system memory coupled to the GUI 700. The sequence of items could correspond to a process, where a separate step or task is assigned to each item of the process. The process could be accomplished by executing the tasks assigned to the items. Work area 725 displays an interface corresponding to a task assigned to a selected item from the sequence of items. The selected item is a currently active item or item of interest. The currently active item could also mark the progress of the accomplishment of the process.

A user accesses the interface displayed in work area 725 to retrieve and enter information pertinent to the execution of the task that is associated with the currently selected item. For convenience, roadmap area 705 automatically scrolls to place a graphical element corresponding to the currently active item within focal area 715. Thus, the user will have an overview and a guidance of the underlying process, including the current task, the recently accomplished tasks and the forthcoming tasks. The intelligent automatic scrolling saves the users unnecessary scrolling requests. The users could use GUI controls to request scrolling of the displayed graphical elements in the roadmap screen area to review any item from the sequence of items. When the GUI focus is changed to work area 725 from another area, the set of displayed items (e.g., their corresponding graphical elements) scroll automatically to place the graphical element corresponding to the currently active item within focal area 715.

In one embodiment of the invention, the user could accomplish the task assigned to the currently active item using the interface displayed in work area 725. With the accomplishment of the task assigned to the currently active item, GUI 700 automatically selects a next item from the sequence of items as currently active item. The graphical elements in roadmap area 705 scroll automatically towards the next currently active item to move the corresponding graphical element in focal area 715. Work area 725 displays interface corresponding to the task assigned to the next currently active item. The user could scroll the displayed graphical elements and directly select an item, e.g., by clicking on the corresponding graphical element. Thus, the user could jump to execute a task or edit a previous execution of a task without following the order of the sequence. One or some of the items may not be selectable for execution before the execution of a task associated to a previous item. If there is no next item to be automatically selected, accomplishment of the underlying process associated with the sequence of item is reported.

GUI 700 further includes label area 710 and toolbar area 720, according to one embodiment of the invention. Information associated with one or more of the displayed graphical elements are displayed in the label area 710. The information in label area 710 could provide data that is helpful for the user during the execution of the tasks assigned to the items from the sequence of items. For example, label area 710 could include the names of the tasks assigned to the displayed graphical elements. Label area 710 could also show information regarding the order in the sequence of the items that are displayed with corresponding graphical objects, tooltips, instructions regarding the assigned actions, etc. Label area 710 could be adjacent to, or even intersect with roadmap area 705. Toolbar area 720 provides access to one or more commands pertinent to the items displayed in roadmap area 705, or pertinent to the interface displayed in work area 725. According to one embodiment of the invention, toolbar area 720 displays one or more command options selectable by a user in order to initiate a desired action. Examples for possible commands in toolbar area 720 include "go to a previous task", "go to next task", "save data on a disk", "change view", etc.

Figure 8:
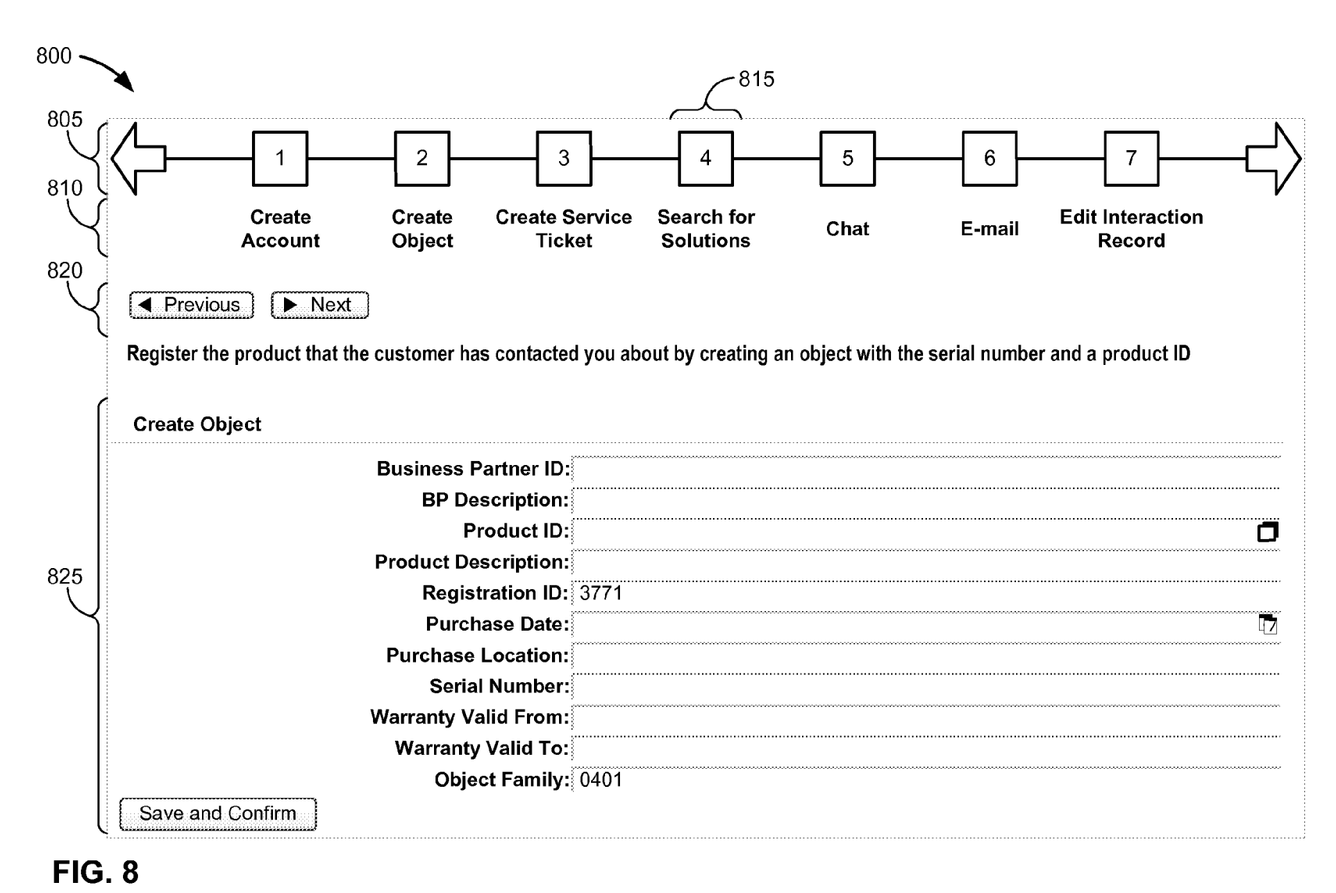
FIG. 8 is a screenshot of a GUI for intelligent information navigation, according to one embodiment of the invention.

FIG. 8 is a screenshot of GUI 800 for intelligent information navigation, according to one embodiment of the invention. GUI 800 includes horizontal roadmap area 805 where a number of graphical elements are displayed. The displayed graphical elements correspond to items of a sequence of items. Roadmap area 805 includes focal area 815 that is specified relative to the evenly distributed graphical elements displayed in roadmap area 805. A graphical element corresponding to a selected currently active item is automatically scrolled to be placed in focal area 815 when the scrolling is possible, e.g., when a next item that is not displayed exists in a direction opposite to the scrolling. Further, GUI 800 includes work area 825 to provide interface to a user to execute a task assigned to the currently selected item. Label area 810 provides the name of the tasks assigned to the items that are displayed by the graphical elements. Toolbar area 820 includes controls selectable by a user to perform particular actions. In the provided example, toolbar area 820 includes "previous" and "next" button controls that help a user to select previous or next item from the sequence of items relative to the currently selected item.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 9:
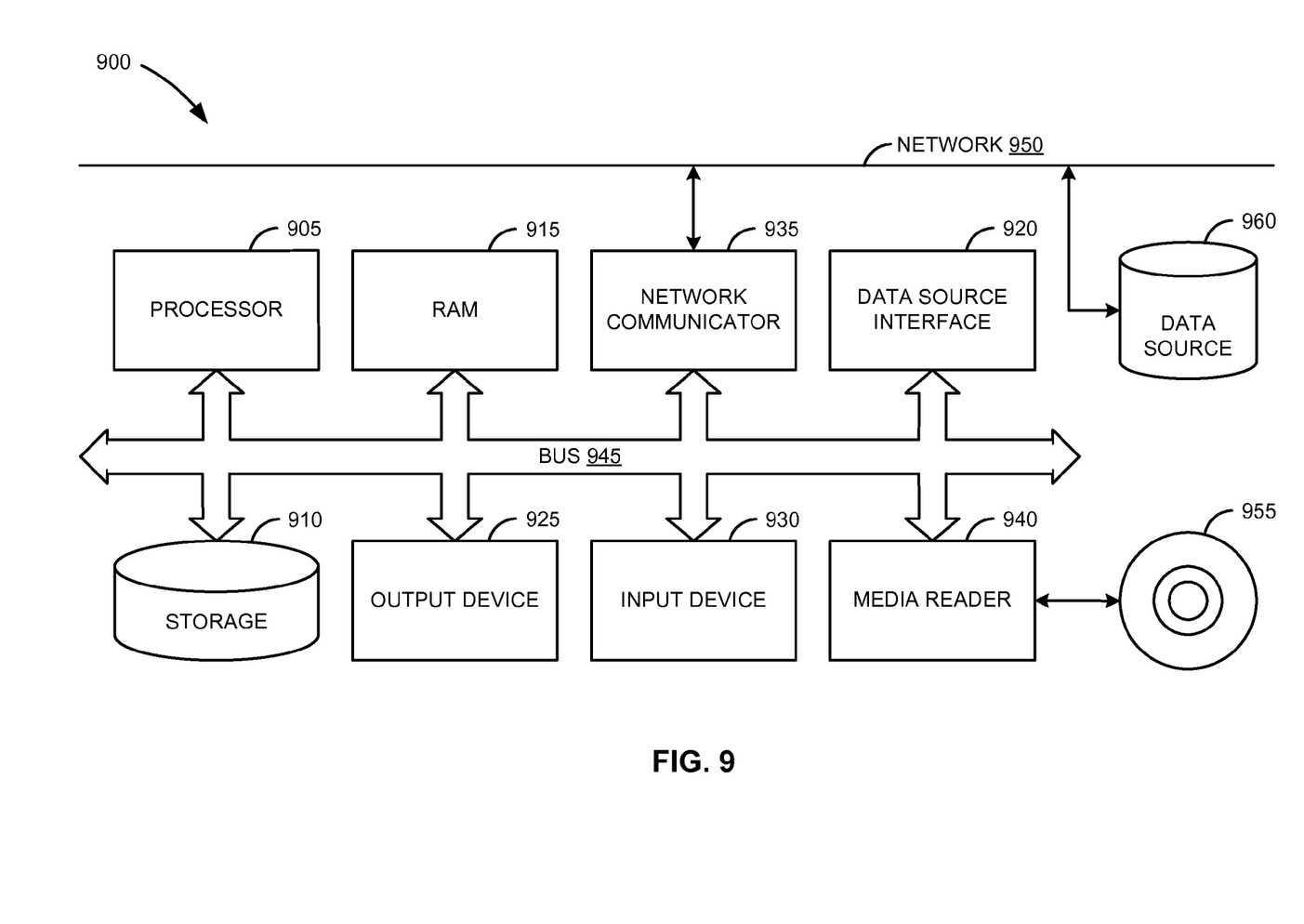
FIG. 9 is a block diagram of an exemplary computer system to execute computer readable instructions for intelligent information navigation, according to one embodiment of the invention.

FIG. 9 is a block diagram of an exemplary computer system 900. The computer system 900 includes a processor 905 that executes software instructions or code stored on a computer readable medium 955 to perform the above-illustrated methods of the invention. The computer system 900 includes a media reader 940 to read the instructions from the computer readable medium 955 and store the instructions in storage 910 or in random access memory (RAM) 915. The storage 910 provides a large space for keeping static data where at least some instructions could be stored for later execution. The stored instructions may be further compiled to generate other representations of the instructions and dynamically stored in the RAM 915. The processor 905 reads instructions from the RAM 915 and performs actions as instructed. According to one embodiment of the invention, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. Each of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be access via one or more abstraction layers implemented in hardware or software. For example, the data source 960 may be access by network 950. In some embodiments the data source 960 may be accessed via an abstraction layer, such as, a semantic layer.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A non-transitory computer readable medium storing instructions thereon, which when executed by a processor cause a computer system to:
   store a sequence of items in a memory of the computer system, wherein the sequence of items corresponds to a plurality of tasks of a process, and wherein an execution of at least one task of the plurality of tasks changes a state of completion of the process;
   display a plurality of graphical elements in a first screen area, wherein each graphical element corresponds to an item of the sequence of items, and wherein the plurality of graphical elements is ordered in correspondence with the sequence of items;
   in response to a scroll request, scroll the plurality of graphical elements to gradually include at least one new graphical element in the first screen area from direction of scrolling;
   receive a selection of an item of the sequence of items as a currently active item, wherein the item is outside the focal position;
   in response to receiving the selection of the currently active item, trigger automatic scrolling of the plurality of graphical elements wherein the plurality of graphical elements are automatically scrolled until a graphical element corresponding to the currently active item is displayed at a focal position within the first screen area; and
   wherein displaying the plurality of graphical elements in the first screen area comprises: displaying the plurality of graphical elements as a horizontal sequence of similar graphical objects; and displaying a label next or within a graphical element of the plurality of graphical elements, wherein the label indicates a position of a corresponding item in the sequence of items.

2. The non-transitory computer readable medium of claim 1, further storing instructions for:
   displaying in a second screen area an interface corresponding to a task of the plurality of tasks, wherein the task is assigned to the currently active item, and wherein the interface allows a user to one or more of accessing and entering data pertinent to an execution of the task.

3. The non-transitory computer readable medium of claim 2, further storing instruction for:
   scrolling automatically the plurality of graphical elements to display the graphical element corresponding to the currently active item at the focal position within the first screen area when changing a GUI focus to the second screen area from another screen area.

4. The non-transitory computer readable medium of claim 2, further storing instructions for:
   receiving a selection of a next item of the sequence of items as a next currently active item by confirming the data displayed on the second screen area;
   scrolling automatically the plurality of graphical elements to display a graphical element corresponding to the next currently active item at the focal position within the first screen area; and
   displaying in the second screen area an interface corresponding to a next task, wherein the task is associated with the next currently active item, and wherein the interface allows a user to one or more of entering and accessing data pertinent to an execution of the next task.

5. The non-transitory computer readable medium of claim 1, wherein storing the sequence of items comprises:
   generating an item of the sequence of items based on a program object description, wherein the program object description specifies an attribute to define a behavior of the item.

6. The non-transitory computer readable medium of claim 1, wherein scrolling the plurality of graphical elements comprises:
   receiving a selection of a GUI control to request scrolling in a particular direction.

7. The non-transitory computer readable medium of claim 1, wherein scrolling the plurality of graphical elements comprises:
   displaying the at least one new graphical element in an emerging mode while being gradually included in the first screen area.

8. In a computer system coupled with a display to render a graphical user interface (GUI), a method for intelligent information navigation comprising:
   storing a sequence of items in a memory of the computer system, wherein the sequence of items corresponds to a plurality of tasks of a process, and wherein an execution of at least one task of the plurality of tasks changes a state of completion of the process;
   displaying a plurality of graphical elements in a first screen area, wherein each graphical element corresponds to an item of the sequence of items, and wherein the plurality of graphical elements is ordered in correspondence with the sequence of items;
   in response to a scroll request, scrolling the plurality of graphical elements to gradually include at least one new graphical element in the first screen area from direction of scrolling;
   receiving a selection of an item of the sequence of items as a currently active item, wherein the item is outside the focal position;
   in response to receiving the selection of the currently active item, trigger automatic scrolling the plurality of graphical elements, wherein the plurality of graphical elements are automatically scrolled until a graphical element corresponding to the currently active item is displayed at a focal position within the first screen area; and wherein displaying the plurality of graphical elements in the first screen area comprises: displaying the plurality of graphical elements as a horizontal sequence of similar graphical objects; and displaying a label next or within a graphical element of the plurality of graphical elements, wherein the label indicates a position of a corresponding item in the sequence of items.

9. The method of claim 8, further comprising:

displaying in a second screen area an interface corresponding to a task, wherein the task is assigned to the currently active item, and wherein the interface allows a user to one or more of accessing and entering data pertinent to an execution of the task.

10. The method of claim 9, further comprising:

scrolling automatically the plurality of graphical elements to display the graphical element corresponding to the currently active item at the focal position within the first screen area when changing a GUI focus to the second screen area from another screen area.

11. The method of claim 9, further comprising:

receiving a selection of a next item of the sequence of items as a next currently active item by confirming the data displayed on the second screen area;

scrolling automatically the plurality of graphical elements to display a graphical element corresponding to the next currently active item at the focal position within the first screen area; and displaying in the second screen area an interface corresponding to a next task, wherein the task is associated with the next currently active item, and wherein the interface allows a user to one or more of entering and accessing data pertinent to an execution of the next task.

12. The method of claim 8, wherein storing the sequence of items comprises:

generating an item of the sequence of items based on a program object description, wherein the program object description specifies an attribute to define a behavior of the item.

13. The method of claim 8, wherein scrolling the plurality of graphical elements comprises:

receiving a selection of a GUI control to request scrolling in a particular direction.

14. The method of claim 8, wherein scrolling the plurality of graphical elements comprises:

displaying the at least one new graphical element in an emerging mode while being gradually included in the first screen area.

15. A computer system to render a graphical user interface (GUI) for intelligent information navigation on a display device, the system including:

a memory to store computer executable instructions; and a processor coupled to the memory to execute the instructions to generate:

a roadmap area of the GUI for displaying a plurality of graphical elements, wherein each graphical element of the plurality of graphical elements corresponds to an item from a sequence of items, and wherein the plurality of graphical elements is ordered in correspondence with the sequence of items;

at least one control graphical element selectable with a user input device to request a scrolling of the plurality graphical elements to gradually include at least one new graphical element in a first screen area at direction of scrolling;

a focal area of the GUI, wherein in response to receiving a selection of a currently active item that is outside the focal area, automatic scrolling of the plurality of graphical elements is triggered, and wherein the plurality of graphical elements are automatically scrolled until a graphical element corresponding to the currently active item is displayed in the focal area within the first screen area; and wherein displaying the plurality of graphical elements in the first screen area comprises: displaying the plurality of graphical elements as a horizontal sequence of similar graphical objects; and displaying a label next or within a graphical element of the plurality of graphical elements, wherein the label indicates a position of a corresponding item in the sequence of items.

16. The computer system of claim 15, wherein the GUI further comprising:

a work area for displaying an interface corresponding to a task of a process, wherein the task is associated with the currently active item, and wherein the interface allows a user to one or more of enter and access data pertinent to an execution of the task.

17. The computer system of claim 15, wherein the GUI further comprising:

a label area to display a label next or within a graphical element corresponding to an item of the sequence of items, wherein the label indicates a position of a corresponding item in the sequence of items.

18. The computer system of claim 15, wherein the GUI further comprising:

a toolbar area to display a command option pertinent to the currently displayed information in one or more of the first screen area and the second screen area.

* * * * *